(12) United States Patent
Ogata et al.

(10) Patent No.: US 6,925,043 B2
(45) Date of Patent: Aug. 2, 2005

(54) OPTICAL RECORDING APPARATUS AND METHOD FOR CONTROLLING LIGHT SOURCE OUTPUT USING DETECTED ABERRATION

(75) Inventors: Daisuke Ogata, Amagasaki (JP); Katsuya Watanabe, Nara (JP); Yuuichi Kuze, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 619 days.

(21) Appl. No.: 10/017,312

(22) Filed: Oct. 30, 2001

(65) Prior Publication Data

US 2002/0105878 A1 Aug. 8, 2002

(30) Foreign Application Priority Data

Oct. 30, 2000 (JP) .......................................... 2000-331262

(51) Int. Cl.⁷ ............................................... G11B 7/00
(52) U.S. Cl. .............................. 369/53.19; 369/112.01; 372/45
(58) Field of Search .......................... 369/53.19, 112.01; 372/45

(56) References Cited

U.S. PATENT DOCUMENTS 5,781,576 A * 7/1998 Kimura et al. ................. 372/45
5,789,734 A * 8/1998 Torigoe et al. ........... 250/201.2
5,903,536 A * 5/1999 Lee et al. ............... 342/357.03

FOREIGN PATENT DOCUMENTS

EP 0 984 440 5/2000
JP 2000-155979 6/2000

* cited by examiner

Primary Examiner—Gautam R. Patel
(74) Attorney, Agent, or Firm—RatnerPrestia

(57) ABSTRACT

An optical recording apparatus has a semiconductor laser for generating a light spot used for information recording, a detector for detecting the aberration amount of the light spot, and a controller for controlling the output of the semiconductor laser by use of the detected aberration amount.

7 Claims, 3 Drawing Sheets

OPTICAL RECORDING APPARATUS AND METHOD FOR CONTROLLING LIGHT SOURCE OUTPUT USING DETECTED ABERRATION

BACKGROUND OF THE INVENTION

1. Field of the Invention

The present invention relates to an optical disk apparatus that, for example, converges a luminous flux emitted from a light source on an information recording surface through a transparent substrate of an optical disk, and performs information recording and reproduction on the information recording surface.

2. Related Art of the Invention

Light converged on the information recording surface of an optical disk is converged into the smallest light spot when the phase is uniform. However, in actuality, aberrations exist in optical systems that condense a luminous flux emitted from a light source on the information recording surface of an optical disk. Because of this, the phase becomes nonuniform, so that the luminous flux is converged into a light spot slightly larger than a so-called diffraction-limited light spot formed when there is no aberration. Aberrations in optical systems that are permissible in an optical apparatus are generally known as the Marechal criterion, and the value thereof is, when the wavelength of the light is $\lambda$, substantially 0.07 $\lambda$ in RMS (root-mean-square) value.

Since the intensity of a light spot exhibits a Gaussian distribution where the intensity is maximum at the center and rapidly decreases with distance from the center, the energy supplied to the recording film of the disk during recording is concentrated on the center of the spot.

At the same light source output, when the spot diameter increases due to aberrations in the optical system, the energy at the center of the spot is lower than that when there is no aberration, so that the energy supplied to the recording film is lower. This degrades recording characteristics.

The aberrations in optical systems include aberrations of optical parts, aberrations due to residual adjustment errors of optical systems, aberrations due to tilts of optical disks, base material thickness errors of optical disks and variations in refractive index and aberrations due to control errors such as defocus.

Of these aberrations, aberrations of optical parts and aberrations due to residual adjustment errors of optical systems are specific to apparatuses. Therefore, the light source outputs can be adjusted in advance by initial adjustment of optical disks. Of other energy decreasing factors, for the factors that do not vary with disk rotation (specifically, factors dependent on the composition of the recording film of the optical disk), the light source output set value that yields the best recording quality can be obtained by so-called recording power learning to perform trial recording while changing the light source output in several steps.

This prior art is effective against the energy varying factors that do not vary with disk rotation and tries to provide a practicable optical disk apparatus without limiting the aberrations in optical systems to strict specifications that are difficult to realize.

However, when there is a factor that varies with disk rotation such as a local variation in disk tilt or a local variation in base material thickness and the energy density reduction cannot be compensated for by the recording power learning or a tilt control to tilt the entire optical system so that the optical axis is vertical to the disk, reduction in recording signal quality cannot be avoided.

Specifically, the light source wavelength has been decreasing and the density has been increasing with increasing NA (numerical aperture) particularly in recent years, and with this, spherical aberration due to a variation in disk base material thickness increases.

For example, when the wavelength and the NA are 650 nm and 0.6 which are used for DVDs, respectively, the spherical aberration caused by a base material thickness error of 10 $\mu$m is only 0.01 $\lambda$; however, when the wavelength and the NA are 405 nm and 0.85, respectively, the spherical aberration is 0.10 $\lambda$ which exceeds the Marechal criterion and is as large as ten times the spherical aberration caused in the case of DVDs.

As is apparent from this, in the latter case, to suppress the spherical aberration to approximately 0.03 $\lambda$ that does not disturb recording and reproduction, a base material thickness error of only 3 $\mu$m is permissible. However, a base material thickness variation of this extent can occur within one track of a disk. Particularly, on inner and outer tracks of a disk, the variation can be larger. In such a case, a recording energy variation that cannot be compensated for by the recording power learning occurs due to a variation in spherical aberration, so that deterioration of recording signal quality cannot be avoided.

For factors that vary moderately, for example, a warp of the disk due to a temperature increase in the optical disk apparatus, it is necessary to perform the recording power learning over again as required, and when image data continuing for a long time is recorded, learning cannot always be performed at an appropriate time. In a case where learning is performed when recording is started, there is a wait of the time necessary for the learning before recording is started, and this hinders the promptness of the operation of the apparatus.

As described above, for example, a recording energy variation that cannot be compensated for by the recording power learning occurs, so that deterioration of recording signal quality cannot be avoided.

SUMMARY OF THE INVENTION

In view of the above-mentioned prior art problem, an object of the present invention is to provide an optical recording apparatus, an optical recording method, a medium and an information aggregate capable of suppressing the deterioration of recording signal quality that cannot be prevented by the conventional method.

One aspect of the present invention is an optical recording apparatus comprising:

a light source for generating a light spot used for information recording;

detection means of detecting an aberration amount of the light spot or a signal associated with the aberration amount; and control means of controlling an output of the light source by use of the detected aberration amount or the associated signal.

Another aspect of the present invention is an optical recording apparatus, wherein said detection means detects the detected aberration amount as an aberration detection signal S, and wherein said control means controls the output of the light source so that, when the output of the light source necessary for the recording under a condition where S=0 is $P_0$, the output is $P_0/(1-K \cdot S^2)$ for a predetermined constant K.

Still another aspect of the present invention is an optical recording apparatus, wherein said aberration amount is substantially a spherical aberration amount and/or a coma aberration amount.

Yet still another aspect of the present invention is an optical recording apparatus, wherein said detection means is capable of detecting the spherical aberration amount and the coma aberration amount, and outputs the spherical aberration amount as a spherical aberration detection signal $S_1$ and outputs the coma aberration amount as a coma aberration detection signal $S_2$, and wherein said control means controls the output of the light source so that, when the output of the light source necessary for the recording under a condition where $S_1=S_2=0$ is $P_0$, the output is $P_0/(1-K\cdot(S_1^2+S_2^2))$ for a predetermined constant K.

Still yet another aspect of the present invention is an optical recording apparatus, wherein said information recording is performed on an optical disk, wherein said detection means detects and outputs a tilt amount of the optical disk as the signal associated with the aberration amount, and wherein the coma aberration amount is calculated based on a predetermined relationship that holds between the coma aberration amount and the tilt amount.

A further aspect of the present invention is an optical recording apparatus, wherein said information recording is stopped when $1/(1-K\cdot S^2)>1.5$.

A still further aspect of the present invention is an optical recording apparatus, wherein said detection means detects the detected aberration amount as an aberration detection signal S, and wherein when the aberration detection signal and the output of the light source obtained by initial learning in the recording are $S_i$ and $P_i$, respectively, said control means controls the output of the light source so that the output is $P_i(1-K\cdot S_i^2)/(1-K\cdot S^2)$ for a predetermined constant K.

A yet further aspect of the present invention is an optical recording method of controlling a light source for generating a light spot used for information recording, said method comprising:

a detection step of detecting an aberration amount of the light spot or a signal associated with the aberration amount; and a control step of controlling an output of the light source by use of the detected aberration amount or the associated signal.

A still yet further aspect of the present invention is a program for causing a computer to function as all or part of the control means of the optical recording apparatus.

An additional aspect of the present invention is a program for causing a computer to perform all or part of the control step of the optical recording method.

A still additional aspect of the present invention is a medium carrying a program for causing a computer to function as all or part of the control means of the optical recording apparatus, said medium being computer-processable.

A yet additional aspect of the present invention is a medium carrying a program for causing a computer to perform all or part of the control step of the optical recording method, said medium being computer-processable.

EXPLANATION OF REFERENCE NUMERALS

Figure 1:
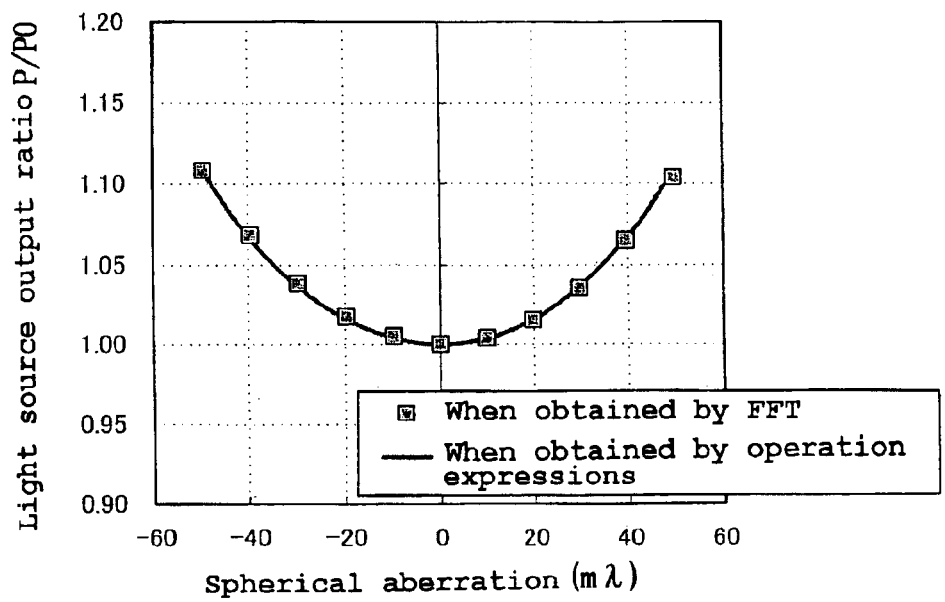
FIG. 1 is an explanatory view of a necessary light source output when spherical aberration exits.

1 Lens
2 Optical disk
3 Beam splitter
4 Light receiving element
5 Semiconductor laser
6 Detection means
7 Control means

DETAILED DESCRIPTION OF THE PREFERRED EMBODIMENTS

Hereinafter, an embodiment of the present invention will be described with reference to the drawings.

Figure 5:
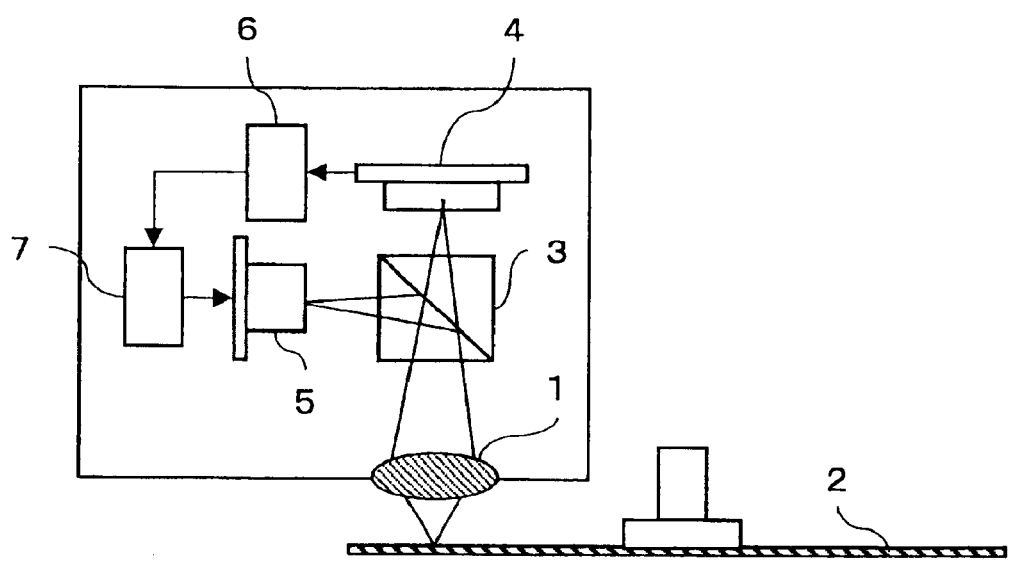
FIG. 5 shows the structure of an optical disk apparatus according to an embodiment of the present invention.

First, the structure and the operation of an optical disk apparatus of the present embodiment will be described with reference to FIG. 5 showing the structure of the optical disk apparatus of the present embodiment. An embodiment of the optical recording method of the present invention will be described at the same time when the operation of the optical disk apparatus of the present embodiment is described.

The optical disk apparatus of the present embodiment has a semiconductor laser 5 for generating a light spot on an optical disk 2, detection means 6 of detecting the aberration amount of the generated light spot, and control means 7 of controlling the output from the semiconductor laser 5 by use of the detected aberration amount. The optical disk apparatus of the present embodiment corresponds to the optical recording apparatus of the present invention.

The light emitted from the semiconductor laser 5 passes through a beam splitter 3 and is condensed on the optical disk 2 by a lens 1. The light reflected from the optical disk 2 is condensed by the lens 1, reflected at the beam splitter 3, and condensed on a light receiving element 4.

Using the light condensed on the light receiving element 4, the detection means 6 detects the aberration amount of the light spot as a detection signal S for detecting the aberration amount. The control means 7 sets the light source output to a value calculated by an expression 7 shown later in accordance with the detection signal 7 as described below in detail.

Next, the principle of the present invention will be described in detail that deterioration of recording signal quality is prevented by adjusting the light source output based on an analysis of the variation in the energy contributing to recording which variation is caused due to an aberration variation.

Since the energy supplied to the recording film of the disk during recording is concentrated on the center of the light spot as mentioned above, the magnitude of the center intensity is substantially proportional to the energy contributing to recording.

Therefore, when the center intensity under an ideal condition where there is no aberration in the optical system is $I_0$ and the center intensity when aberrations exist is I, the ratio $I/I_0$ therebetween is, as is apparent from the description given above, equivalent to the ratio of the energy contributing to recording when aberrations exist to the energy contributing to recording under the ideal condition.

Therefore, when aberrations exist, by making the light source output higher than an output $P_0$ under the ideal condition where there is no aberration in the optical system (S=0) at a ratio $I_0/I$ which is the reciprocal of $I/I_0$, the energy contributing to recording can be maintained equal to that when there is no aberration. That is, this is achieved by setting the light source output to P calculated by the following expression 1:

$$P=(I_0/I)\cdot P_0 \qquad \text{[Expression 1]}$$

The center intensity ratio $I/I_0$ is generally called Strehl ratio. When the RMS value of spherical aberration (hereinafter, referred simply to aberration) is W, the following expression 2 holds approximately:

$$I/I_0=1-(2\pi W/\lambda)^2 \qquad \text{[Expression 2]}$$

Of the aberrations generated in optical disk apparatuses, except the components that can be measured in advance and do not vary with disk rotation, spherical aberration and coma aberration are predominant among aberrations that can vary during the operation, and causes therefor are local variations in the base material thickness and the tilt of the disk as mentioned above.

For spherical aberration and coma aberration, various methods of detecting the aberration amount have been proposed. As described above, the optical disk apparatus of the present embodiment has such detecting means. The detection signal S which is proportional to the aberration amount W is expressed by the following expression 3 by use of a detection sensitivity C (constant):

$$S=C\cdot W \qquad \text{[Expression 3]}$$

Here, the inventor of the present application has found that the following expression 4 holds by using the expressions 2 and 3:

$$I/I_0=1-(2\pi S/(C\lambda))^2 \qquad \text{[Expression 4]}$$

That is, the expression 4 represents the relationship between the detection signal S which is the output of the detection means of detecting the aberration amount and the Strehl ratio $I/I_0$. The inventor of the present application has found that a desired light source output P is obtained through the Strehl ratio $I/I_0$ by obtaining the detection signal S from the expressions 4 and 1.

Further, letting $$K=(2\pi/(C\lambda))^2 \qquad \text{[Expression 5]}$$

to simplify the expression 4, since the terms on the right side of the expression 5 are all constants, K can be treated as one constant, so that the expression 4 can be expressed as the following expression 6:

$$I/I_0 1-K\cdot S^2 \qquad \text{[Expression 6]}$$

Therefore, from the expressions 1 and 6, the following expression 7 is obtained:

$$P=P_0/(1-K\cdot S^2) \qquad \text{[Expression 7]}$$

When the optimum light source output $P_0$ under a condition where there is no base material thickness error or tilt variation is known, by setting the light source output to a value calculated by the expression 7 in accordance with the detection value S of the detecting means of detecting the aberration, the energy contributing to recording can be maintained substantially constant even when there is an aberration variation, so that deterioration of recording signal quality can be prevented.

This control method is based on a completely different idea from the conventional control methods by aberration correction such as the tilt control and the spherical aberration control. The conventional controls which are performed by physically moving apart or the whole of the optical system cannot sufficiently respond to high-speed variations as those caused while the disk is rotating. However, the control of the present invention which is electrically performed can sufficiently respond to high-speed variations.

The value of the constant K which is obtained by substituting the sensitivity C of the aberration detection means into the expression 5 may directly be obtained by measuring the optimum light source output by causing a known base material thickness variation or tilt variation at the time of the initial adjustment of the optical disk apparatus.

Figure 2:
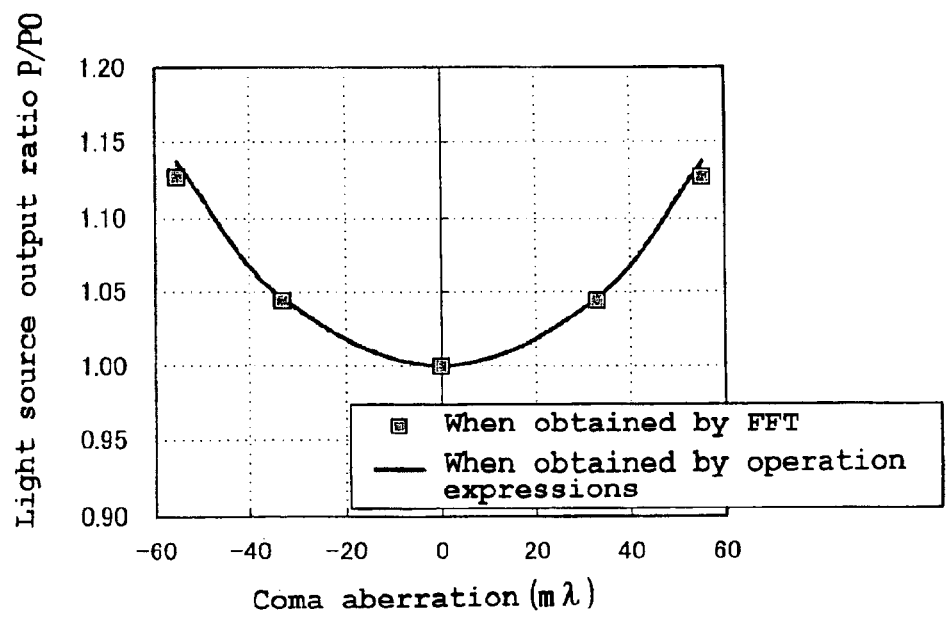
FIG. 2 is an explanatory view of a necessary light source output when coma aberration exits.

FIG. 1 shows a comparison between an output ratio obtained, assuming that the aberration is spherical aberration, by calculating the Strehl ratio when spherical aberration exists by an FFT analysis and substituting the calculated Strehl ratio directly into the expression 1 and an output ratio obtained by substituting the aberration amount into the expression 7. For simplicity, it is assumed that the aberration detection sensitivity C is 1. FIG. 2 is a graph in the case of coma aberration obtained, assuming that the aberration is coma aberration, in a similar manner to the case of spherical aberration.

In any case, the result by the FFT analysis is substantially the same as the result by the expression 7 using the expression 2 which is an approximate expression. Therefore, it is apparent that the setting of the light source output by the expression 7 is effective.

The above described is a case where a single kind of aberration exists, and the aberration signal is represented by the single symbols. However, in actual optical disk apparatuses, spherical aberration and coma aberration can be generated at the same time. Even in such a case, in optical disk apparatuses having both detection means for spherical aberration and detection means for coma aberration, the operation expressions can be derived based on the same idea.

A wavefront aberration W which is the square root of the sum of squares of the aberration components is expressed as shown below when spherical aberration is $W_1$ and coma aberration is $W_2$. In the description given below, the symbols associated with spherical aberration are marked with a numerical subscript 1, whereas the symbols associated with coma aberration are marked with a numerical subscript 2.

$$W^2=W_1^2+W_2^2 \qquad \text{[Expression 8]}$$

A relationship shown by the following expression 9 holds between the aberration $W_1$ and an aberration detection signal $S_1$ like the expression 3, and similarly, a relationship shown by the following expression 10 holds between the aberration $W_2$ and an aberration detection signal $S_2$:

$$S_1=C_1\cdot W_1 \qquad \text{[Expression 9]}$$

$$S_2=C_2\cdot W_2 \qquad \text{[Expression 10]}$$

C1 and C2 are detection sensitivities of the aberrations. Since the detection means of detecting aberrations are normally provided with a volume for electrically controlling the sensitivity, the detection sensitivities of spherical aberration and coma aberration can be set to be substantially the same. For example, the detection signal voltage per an aberration of 0.01 λ can be set to 10 mV. The detection sensitivity in this case is 1.0 V/λ. When the sensitivities set to be substantially the same as described above are C, the following expression is derived from the expressions 8 to 10:

$$W^2 = (S_1^2 + S_2^2)/C^2 \quad \text{[Expression 11]}$$

Substituting the expression 11 into the expression 2 and reorganizing the expression 2, similarly, $$I/I_0 = 1 - (2\pi/C\lambda)^2 (S_1^2 + S_2^2) \quad \text{[Expression 12]}$$

$$P = P_0/(1 - K \cdot (S_1^2 + S_2^2)) \quad \text{[Expression 13]}$$

where $P_0$ is the light source output under the ideal condition where S1=S2=0.

Figure 3:
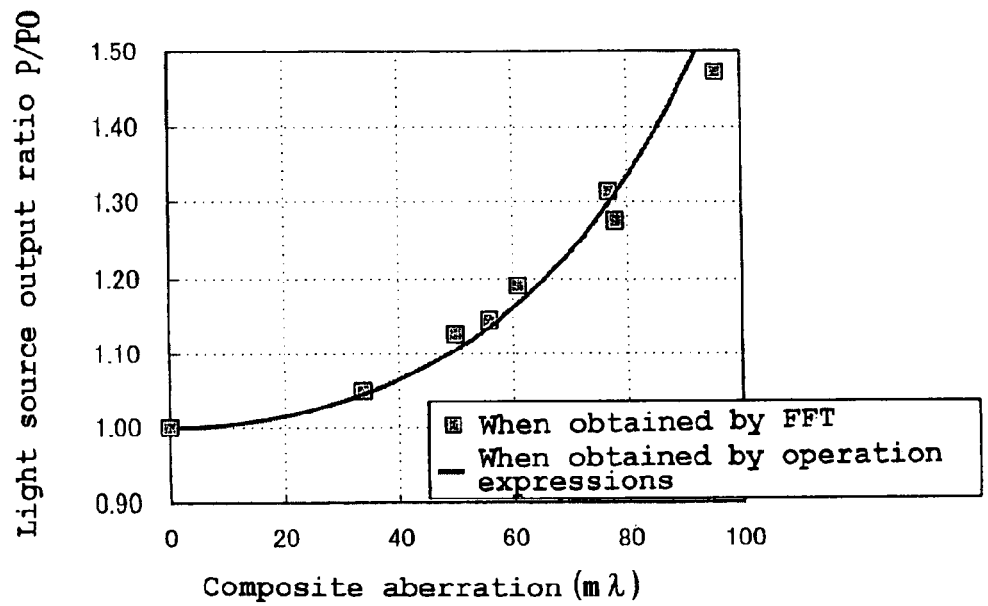
FIG. 3 is an explanatory view of a necessary light source output when both spherical aberration and coma aberration exist.

FIG. 3 shows a comparison between an output ratio $P/P_0$ obtained by calculating the Strehl ratio by the FFT analysis and substituting the calculated Strehl ratio directly into the expression 1 and an output ratio $P/P_0$ obtained by substituting the aberration amount into the expression 13 for various combinations of spherical aberration and coma aberration. The horizontal axis of FIG. 3 represents a composite wavefront aberration expressed by the square root of the sum of squares of spherical aberration and coma aberration. In this case, it is apparent that these output ratios are in good agreement with each other like in the case described with reference to FIGS. 1 and 2. As described above, by the expression 13, the light source output compensation value can accurately be obtained also when spherical aberration and coma aberration are generated at the same time.

Figure 4:
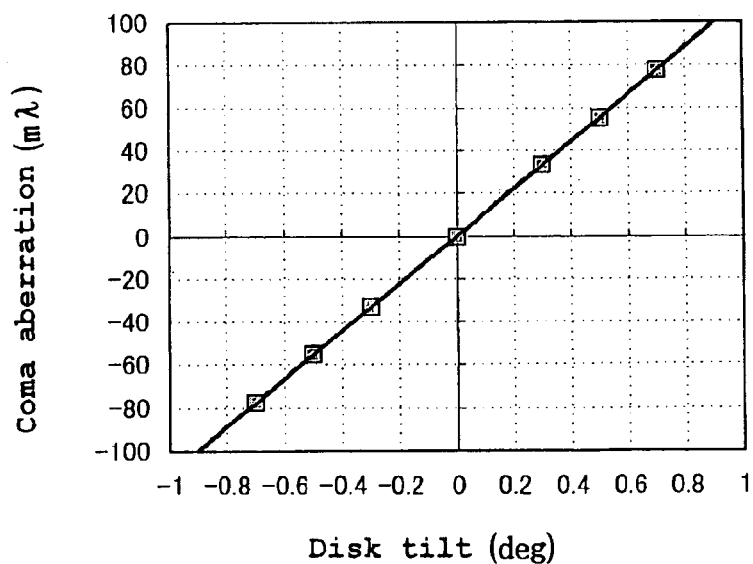
FIG. 4 is an explanatory view showing a relationship between a disk tilt and coma aberration.

While the method of detecting spherical aberration and coma aberration is not detailed in the description given above, any of the proposed various detection methods may be used. For example, an aberration detection signal is used that is obtained by a method such that the reflected light from the optical disk is divided into a plurality of regions by a hologram, the light beams are separately detected by the corresponding photodetectors and an aberration detection signal is generated from the signals thereof as shown in Japanese Patent Application Laid-open No. H12-155979. Optical disk apparatuses having a low margin for disk tilts frequently employ a tilt servo that directly detects the tilts of the optical axis and the disk surface and corrects the tilts. In such optical disk apparatuses, the method of detecting a disk tilt can be applied to the present invention as it is. FIG. 4 shows a relationship between the amount of a disk tilt and a calculation value of the amount of coma aberration generated in accordance with the disk tilt. Coma aberration is substantially proportional to the disk tilt within a range of approximately the disk tilt ±1° which is normally considered a problem in optical disk apparatuses. Therefore, the tilt detection signal can be used as the coma aberration detection signal as it is.

The signal associated with the aberration amount of the present invention corresponds to the tilt detection signal.

In the Marechal criterion generally regarded as a criterion for securing recording and reproduction quality, the RMS value of the wavefront aberration is 0.07 λ as mentioned above. Substituting this into the expression 2, $I/I_0=0.807$, and the light source output set value in this case is $P=1.24P_0$ from the expression 1. Therefore, when the light source output set value exceeds this value, even if recording is performed, recording of sufficient quality is not performed. Since in actual optical disk apparatuses, the light source output normally has a margin of approximately 20% to deal with variations in the sensitivity of the recording film of the disk, when this is considered, the light source output limit set value for securing recording quality is $P=1.2 \times 1.24 P_0 = 1.49 P_0$. Therefore, to secure sufficient recording quality, when the light source output set value calculated by the expression 7 satisfies $$P/P_0 > 1.5, \quad \text{[Expression 14]}$$

defective recording is suppressed by performing a control so that the recording sequence is stopped before recording is performed.

While in the present embodiment, the cases of spherical aberration and coma aberration which normally become a problem in the conventional optical disk apparatuses are described, since the approximate relational expression 2 of the Strehl ratio and the wavefront aberration holds irrespective of the kind of the aberration, it is obvious that when an aberration other than spherical aberration and coma aberration, for example, astigmatism or a third- or higher-order aberration is a problem, the aberration can be dealt with in a similar manner to the above-described cases as long as a detection method for the aberration is provided.

As is apparent from the description given above, the optical disk apparatus of the present invention is structured, for example, as follows: Means of detecting the aberration amount of a light spot is provided, and recording is performed at the light source output P calculated by $P=P_0/(1-K \cdot S^2)$ where S is the aberration detection signal and $P_0$ is the light source output necessary for recording when S is 0. Here, K is a constant.

Moreover, the aberration is mainly spherical aberration and/or coma aberration.

Moreover, means of detecting the coma aberration amount and the spherical aberration amount of a light spot is provided, the detection sensitivities of the aberrations are set to be substantially the same, and recording is performed at the light source output P calculated by $P=P_0/(1-K \cdot (S_1^2 + S_2^2))$ where $S_1$ is the spherical aberration detection signal, $S_2$ is the coma aberration detection signal and $P_0$ is the light source output necessary for recording when $S_1$ and $S_2$ are both 0. Here, K is a constant.

Moreover, when the aberration is coma aberration, aberration detection is performed by disk tilt detection.

Moreover, when the light source output set value satisfies $P/P_0>1.5$, recording is stopped.

These realize an optical disk apparatus offering excellent performance by performing recording energy compensation not requiring learning by calculating by use of the aberration detection signal the light source output compensation amount necessary for compensating for the decrease in recording power due to spherical aberration and/or coma aberration being main aberrations that vary while the optical disk apparatus is operating.

The present invention is a program for causing a computer to perform the functions of all or some of the means (or apparatuses, elements, circuits, portions or the like) of the above-described optical recording apparatus of the present invention which program operates in cooperation with the computer.

Moreover, the present invention is a program for causing a computer to perform the operations of all or some of the steps (or processes, operations, workings or the like) of the above-described optical recording method of the present invention which program operates in cooperation with the computer.

Moreover, the present invention is a medium carrying a program for causing a computer to perform all or some of the functions of all or some of the means of the above-described optical recording apparatus of the present invention, said medium being computer-readable and said program, being read, performing the functions in cooperation with the computer.

Moreover, the present invention is a medium carrying a program for causing a computer to perform all or some of the operations of all or some of the steps of the above-described optical recording method of the present invention, said medium being computer-readable and said program, being read, performing the operations in cooperation with the computer.

Some of the means (or apparatuses, elements, circuits, portions or the like) of the present invention and some of the steps (or processes, operations, workings or the like) of the present invention mean some of the plural means and some of the plural steps, respectively, or mean some functions of one means and some operations of one step, respectively.

Moreover, a usage of the program of the present invention may be such that the program is recorded on a computer-readable recording medium and operates in cooperation with a computer.

Moreover, a usage of the program of the present invention may be such that the program is transmitted over a transmission medium, is read by a computer and operates in cooperation with the computer.

Moreover, examples of the recording medium include ROMs, and examples of the transmission medium include a transmission medium such as the Internet, light, radio waves and sound waves.

Moreover, the above-mentioned computer of the present invention is not limited to pure hardware such as a CPU, but may include firmware, an OS, and peripherals.

As described above, the structure of the present invention may be realized either as software or as hardware.

While the output control of the present invention is performed at the time of writing onto the optical disk in the above-described embodiment, the present invention is not limited thereto. It may be performed at the time of reading from the optical disk.

While the information recording of the present invention is performed on an optical disk in the above-described embodiment, the present invention is not limited thereto. It maybe performed on, for example, an optical memory card. To sum up, it is necessary for the information recording only to be performed on information recording media for performing information recording and reproduction by use of light energy.

The output control of the present invention may be performed all the time while recording is performed or may be performed at regular time intervals. However, it is to be noted that control can more accurately be performed by the former manner.

It is necessary to set the value of the output $P_0$ under the ideal condition by initial learning at the time of start of recording, because the value depends on the composition of the recording film of the optical disk and varies, for example, among the disk manufacturers. However, since a certain amount of aberrations are generated in actuality when initial learning is performed, the ideal condition where S=0 is difficult to realize. Therefore, the following consideration is made:

When the aberration detection value and the set light source output at the time of initial learning are $S_i$ and $P_i$, respectively, as is apparent from the description given above, $$P_i = P_0/(1-K \cdot S_i^2) \qquad \text{[Expression 15]}$$

holds. Therefore, by erasing $P_0$ from the expression 7 by use of the expression 15, $$P = P_i(1-K \cdot S_i^2)/(1-K \cdot S^2) \qquad \text{[Expression 16]}$$

is obtained. Although the expression 16 is nothing but the expression 7 when $S_i=0$, control can more accurately be performed by storing $S_i$ and $P_i$ obtained by initial learning as described above and calculating the light source output to be set the apparatus is operating.

The optical recording apparatus of the present invention may have initial learning means of initially learning the optimum light source output corresponding to the recording medium and initial learning result storage means of storing the result of the initial learning.

As described above, by adding the present invention to the conventional LPC (Laser Power Control), for example, since the light source output compensation amount can be obtained directly from the aberration detection signal, output compensation can be performed also for energy decreasing factors that cannot be dealt with by the conventional method, so that deterioration of recording signal quality can be suppressed.

As is apparent from the description given above, the present invention has an advantage that an optical recording apparatus, an optical recording method, a medium and an information aggregate capable of suppressing the deterioration of recording signal quality that cannot be prevented by the conventional method can be provided.

What is claimed is:

1. An optical recording apparatus comprising:
    a light source for generating a light spot used for information recording;
    detection means of detecting an aberration amount of the light spot as an aberration detection signal S or detecting a signal associated with the aberration amount, as an aberration detection signal S; and
    control means of controlling an output of the light source by use of the detected aberration amount or the detected associated signal;
    wherein said control means controls the output of the light source so that the output of the light source for recording is $P_0/(1-K \cdot S^2)$ where K is a predetermined constant and $P_0$ is the light source output for recording on condition that there is no aberration, or
    said control means controls the output of the light source so that the output of the light source for recording is $Pi(1-K \cdot Si^2)/(1-K \cdot S^2)$ where K is a predetermined constant and Pi is the light source output for recording on condition that Si is obtained as the aberration detection signal, said Pi and Si are obtained by initial learning when the recording operation is performed.

2. An optical recording apparatus according to claim 1, wherein said aberration amount is substantially a spherical aberration amount and/or a coma aberration amount.

3. An optical recording apparatus according to claim 2, wherein said detection means is capable of detecting the spherical aberration amount and the coma aberration amount, and outputs the spherical aberration amount as a spherical aberration detection signal S1 and outputs the coma aberration amount as a coma aberration detection signal S2, and wherein said control means controls the output of the light source so that, when the output of the light source necessary for the recording under a condition where $S_1=S_2=0$ is $P_0$, the output is $P_0/(1-K \cdot (S_1^2+S_2^2))$ for a predetermined constant K.

4. An optical recording apparatus according to claim 2, wherein said information recording is performed on an optical disk, wherein said detection means detects and outputs a tilt amount of the optical disk as the signal associated with the aberration amount, and wherein the coma aberration amount is calculated based on a predetermined relationship that holds between the coma aberration amount and the tilt amount.

5. An optical recording apparatus according to claim 1, wherein said information recording is stopped when $1/(1-K \cdot S^2) > 1.5$.

6. An optical recording method of controlling a light source for generating a light spot used for information recording, said method comprising:

detecting an aberration amount of the light soot as an aberration detection signal S or detecting a signal associated with the aberration amount, as an aberration detection signal S; and controlling an output of the light source by use of the detected aberration amount or the detected associated signal;

wherein controlling the output of the light source is such that the output of the light source for recording is $P_0/(1-K \cdot S^2)$ where K is a predetermined constant and $P_0$ is the light source output for recording on condition that there is no aberration, or controlling the output of the light source is such that the output of the light source for recording is $Pi(1-K \cdot Si^2)/(1-K \cdot S^2)$ where K is a predetermined constant and Pi is the light source output for recording on condition that Si is obtained as the aberration detection signal, said Pi and Si are obtained by initial learning when the recording operation is performed.

7. A computer-executable program, used by an optical recording apparatus having a light source for generating a light spot used for information recording and a detector for detecting an aberration amount of the light soot as an aberration detection signal S or detecting a signal associated with the aberration amount as an aberration detection signal S, said computer-executable program performing the following steps:

(a) controlling an output of the light source using the aberration detection signal S;

in which said step (a) includes the following step:

(a1) controlling the output of the light source so that the output of the light source for recording is $P_0/(1-K \cdot S^2)$, where K is a predetermined constant and $P_0$ is the light source output for recording on condition that there is no aberration, or (a2) controlling the output of the light source so that the output of the light source for recording is $Pi(1-K \cdot Si^2)/(1-K \cdot S^2)$ where K is a predetermined constant and Pi is the light source output for recording on condition that Si is obtained as the aberration detection signal, in which said step (a2) includes the following step:
   obtaining said Pi and Si by initial learning when the recording operation is performed.

* * * * *

UNITED STATES PATENT AND TRADEMARK OFFICE
CERTIFICATE OF CORRECTION

| | | |
|---|---|---|
| PATENT NO. | : 6,925,043 B2 | Page 1 of 1 |
| APPLICATION NO. | : 10/017312 | |
| DATED | : August 2, 2005 | |
| INVENTOR(S) | : Daisuke Ogata et al. | |

It is certified that error appears in the above-identified patent and that said Letters Patent is hereby corrected as shown below:

<u>Column 11</u>
Line 13, change "soot" to --spot--

<u>Column 12</u>
Lines 6, change "soot" to --spot--

Signed and Sealed this

Second Day of October, 2007

JON W. DUDAS
*Director of the United States Patent and Trademark Office*